United States Patent [19]
Anderson et al.

[11] 3,819,209
[45] June 25, 1974

[54] DUCT CONNECTOR

[75] Inventors: Charles B. Anderson, Spring Lake; William H. Tuggle, Jr., Nunica, both of Mich.

[73] Assignee: Atco Rubber Products, Inc., Grand Haven, Mich.

[22] Filed: June 2, 1972

[21] Appl. No.: 259,012

[52] U.S. Cl. ............... 285/73, 285/158, 285/208, 285/319, 285/DIG. 22
[51] Int. Cl. ............................................. F16l 5/02
[58] Field of Search ............ 285/65, 205, 208, 209, 285/210, 319, 352, 70, 73, 158, 260, DIG. 22

[56] References Cited
UNITED STATES PATENTS

| 606,536 | 6/1898 | Glauber | 285/210 |
|---|---|---|---|
| 905,828 | 12/1908 | Akers | 285/319 X |
| 2,232,517 | 2/1941 | Evans | 285/260 X |
| 2,775,927 | 1/1957 | Wulle | 285/319 X |
| 2,799,518 | 7/1957 | Anderson et al. | 285/319 X |
| 3,373,397 | 3/1968 | Renshaw | 285/65 X |

Primary Examiner—Mervin Stein
Assistant Examiner—David H. Corbin
Attorney, Agent, or Firm—Price, Heneveld, Huizenga & Cooper

[57] ABSTRACT

A universal duct connector includes a collar made of flexible material and having a flange at one end thereof extending around its periphery. Duct material is attached to the end of the collar remote from the flange. A plurality of coupling ears are mounted to the collar at the end adjacent the flange and spaced around the periphery of the collar. Each of the ears includes a tab portion extending outwardly, spaced above, and approximately parallel to the surface of the flange. Alternate coupling ears include slotted apertures to receive tabs shaped in conformity with the tabs of remaining alternately spaced ears such that two connectors can be interconnected to form a sealed joint. A single connector can be employed to couple an end of a duct to a heating apparatus by employing the tabs of each coupling ear as holding flanges which are coupled over the edge of a duct receiving aperture in the heating apparatus. In both uses, a foam polymeric material can be attached to the face of the collar flange to insure an air-tight seal.

12 Claims, 3 Drawing Figures

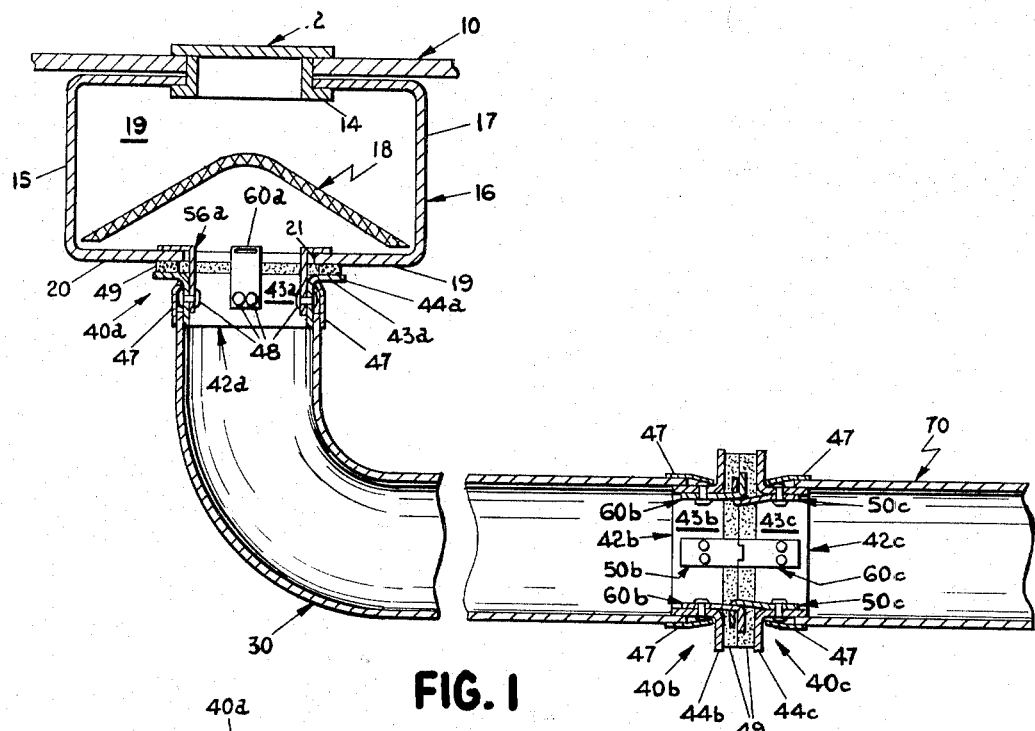
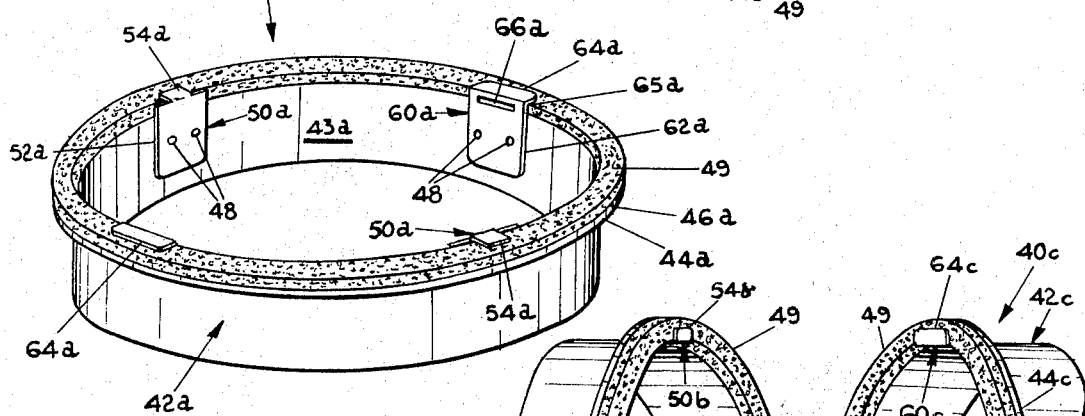
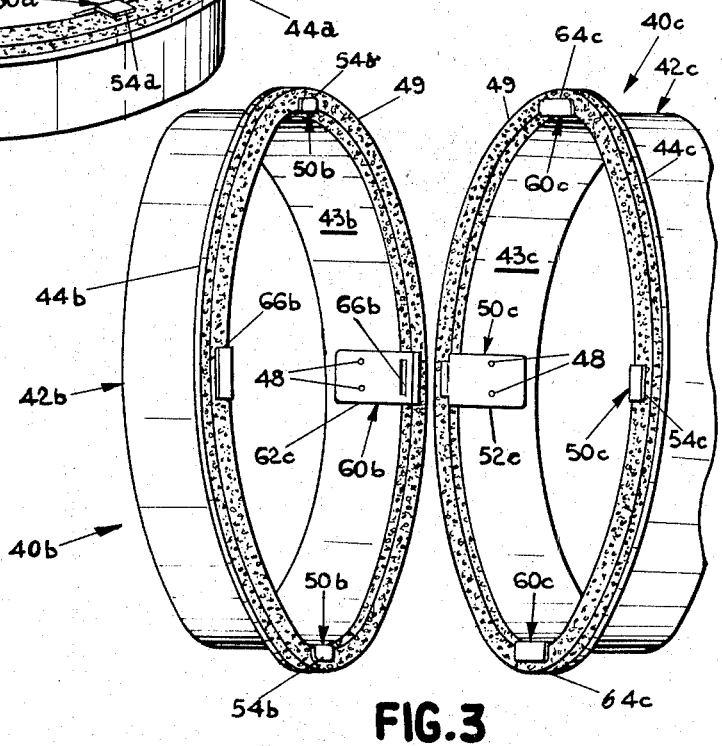

DUCT CONNECTOR

BACKGROUND OF THE INVENTION

The present invention relates to a universal coupling collar for use in coupling heating/cooling duct material to various heating/cooling apparatus and for joining sections of duct material.

Flexible plastic heating duct material of circular cross section is frequently employed in heating/cooling installations and particularly in mobile home heating systems. When sections of this flexible plastic heating duct material are joined or when an end of the duct work is coupled for example to a filter box forming a heating register mounted in the floor of a mobile home; it has been necessary in the past to employ sheet metal connectors which require considerable labor to effect the installation. The problem of interconnecting duct work is even more troublesome in installations where a mobile home has been mounted on a foundation and it is necessary to work under the floor of the mobile home to install the ducts. It is therefore desirable to provide a connector which will avoid the necessity of sheet metal working when installing duct work or when coupling sections of the plastic duct material.

SUMMARY OF THE INVENTION

The apparatus of the present invention provides a universal connector which can serve as a male or female member when two such connectors are used for interconnecting sections of plastic duct work. A single connector can be used to provide a quick and efficient connector for coupling an end of a plastic flexible duct to a filter box or other heating apparatus having a duct receiving aperture. The use of the duct connector of the present invention therefore obviates the need for sheet metal working when installing the ducts for heating or cooling systems.

Apparatus embodying the present invention includes a collar of flexible material shaped to receive duct material at one end thereof. At least a pair of coupling ears are attached to the collar, and include tabs extending outwardly from the collar in spaced relationship to the collar flange. The ears include mounting brackets, one of which includes an aperture therein shaped to receive a tab shaped in substantial conformity with the tab on the mounting bracket of the other ear.

It is an object of the present invention to provide a universal duct connector which can serve as a male or female member when joining two sections of duct work to each other using two such collars.

It is an additional object of the present invention to provide a duct work connector which can be used in pairs to interconnect sections of flexible plastic duct work or singly to couple an end of such duct work to heating apparatus.

It is still an additional object of the present invention to provide a connector having a flexible collar to which is attached a plurality of peripherally spaced coupling ears, alternate ones of which include a tab receiving slot and a relatively wide tab while the remaining ears have a somewhat narrower tab.

These and other objects of the present invention will become apparent upon reading the following specification together with the drawings.

BRIEF DESCRIPTION OF THE DRAWINGS

FIG. 1 is a side elevational view in cross section form showing the use of three connectors each embodying the present invention. One connector is used for connecting one end of a duct to a filter box mounted in the floor of a mobile home, and two connectors interconnect the opposite end of this duct to an end of a second section of duct;

FIG. 2 is a perspective view of a connector embodying the present invention showing the coupling ears and their mounting arrangement; and FIG. 3 is a detailed perspective view showing the coupling ear of one connector and its relation to a coupling ear of a second connector when joining the two connectors.

DETAILED DESCRIPTION OF THE PREFERRED EMBODIMENT

Referring now to FIG. 1, there is shown a portion of the floor 10 of a mobile home (not shown) including a register 12 therein which supplies forced heating or cooling air to the interior of the mobile home. Coupled to the register 12 is a rectangular filter box 16 which is attached to a downwardly depending flange 14 of the register 12 during the manufacture of the mobile home. The filter box 16 comprises a generally rectangular shaped container having side walls 15 and 17, end walls 19 (one shown), and a bottom plate 20. Mounted within the filter box 16 is a filter media 18 which is in a curved position as shown in FIG. 1 when installed, and which is held in this position by opposite ends contacting the side walls 15 and 17 of the filter box 16. The filter media can be removed from the filter box for replacement by removing the top of the register 12 and flexing the filter media 18 to remove the filter media through the open register. The filter box, register and filter media installation form no part of the invention but illustrate heating apparatus with which the connector of the present invention can be employed. The bottom plate 20 of the filter box 16 includes a circular aperture 22 therein for receiving the duct which leads to the supply of forced air (not shown) for the register 12.

A first section 30 of flexible plastic duct material of circular cross section is coupled to an edge 21 of aperture 22 in the filter box by means of a first connector 40a. Connector 40a comprises a collar 42a having a peripherally extending flange 44a thereon as shown in FIG. 2. The collar is made from a suitable flexible resilient polymeric material or plastic which can be deformed radially inwardly temporarily and which will return to its original shape when released. The diameter of the collar 42a permits the flange 44a to contact the bottom surface of the plate 20 around the edge 21 which defines the aperture 22. The flexible plastic duct 30 is coupled to the outer surface 45a of the collar 42a and securely held in place by any suitable means such as tape 47.

The collar 42a is securely held to the bottom plate 20 of the filter box 16 by means of a plurality of circumferentially spaced first and second coupling ears 50a and 60a, respectively, (FIG. 2). FIG. 1 shows oppositely positioned first ears 50a and one second ear 60a. The construction of the individual ears is best illustrated in FIG. 2 which shows that each first type of mounting ear 50a comprises a bracket portion 52a secured to the inside surface 43a of collar 42a by means of rivets or the like 48. The brackets 52a have radially outwardly extending tabs 54a which can be integrally formed therewith and bent to a position approximately parallel to the flange 44a of the collar 42a. The tabs are axially (vertically) spaced from surface 46a of flange 44a as shown in FIG. 1.

Connector 40a includes second coupling ears 60a which have mounting brackets 62a attached to the inside surface of the collar by means of rivets 48 or other fastening means. The ears 60a include outwardly extending tabs 64a integrally formed therewith and which are approximately parallel to and spaced from the surface 46a of the flange 44a. Tabs 64a on ears 60a are somewhat wider than tabs 54a on the ears 50a. The brackets 62a on ears 60a include slots or apertures 66a formed in the brackets 62a immediately adjacent the bend 65a which joins the tabs 64a to the brackets as shown in the figure. The slots 66a are positioned above the surface 46a of flange 44a and shaped to receive the somewhat narrower tabs 54 of a coupling ear 50 on a different collar 40 when two collars are joined together. As explained below, it is noted that if the collar 42a is molded, the ears 50a and 60a can be integrally molded therewith if desired, or separately attached as shown.

When the duct 30 is installed as shown in FIG. 1 into the aperture 22 of the filter box 16 by using collar 40a, each tab 54a and 64a of each of the coupling ears 50a and 60a, respectively, is positioned over the edge 21 of the bottom plate 20 adjacent the aperture. Plate 20 is, therefore, sandwiched between the top surface 46a of the flange 44a on the collar and the bottom surface of the tabs 54a and 64a. To facilitate an air-tight seal, compressible sealing means such as an annular ring of foam polymeric material 49 is cemented to the surface 46a of flange 44a such that it will sealably contact the bottom plate 20 and collar 40a as shown in FIG. 1.

To install the collar 40a to the bottom of the filter box, one of the tabs 54a, (for example the left tab) is positioned over the edge of the aperture. The next adjacent tab 64a on ear 60a is similarly positioned. The side of the flexible collar opposite the first tab 54a is then compressed inwardly allowing the second tab 54a on the opposite mounting bracket mounting ear 50a to be positioned over the edge of the aperture. Finally, the side of the collar opposite the first installed tab 64a is compressed inwardly to allow the second tab 64a to clear the edge and be securely fitted over the edge of the aperture by then releasing this side of the flexible collar. In this manner, therefore, the connector 40a can be installed in any standard sized aperture for which the connector is designed by merely compressing the sides inwardly a sufficient amount to allow the tabs 54a and 64a to clear the edge 21 of the aperture 22 and then releasing the compressive force to allow the resilient collar to spring back to its original shape and hold the duct work attached thereto in sealed communication with the heating apparatus to which it is connected. In some installations it might be possible to use a rigid collar and make the tabs of springable material such as spring steel such that the tabs could be deflected to achieve installation of the connector. Such an arrangement would, however, be considerably more difficult to install since access to the tabs is limited during installation.

The duct 30 can be coupled to a second section of duct 70 as shown in FIG. 1 by employing second and third connectors 40b and 40c, respectively, which are identical to connector 40a. Referring now to FIGS. 1 and 3, connector 40b is attached to the end of the duct 30 remote from its junction with the filter box 16 and attached with tape 47. A similar connector 40c is attached to the end of duct 70 by taping the duct to the outer surface 45c of the collar 42c. As noted above, each of the connectors 40a, 40b and 40c are identical. Identical structure thereof is indicated by the same reference numeral but with a suffix corresponding to the individual collar a, b or c.

The connectors 40b and 40c are coupled together by joining oppositely positioned first and second coupling ears 50 and 60 as shown in FIG. 3. Thus, for example, as shown in the figure, a coupling ear 60b on the connector 40b is correspondingly aligned with a coupling ear 50c on the connector 40c. The tab 54c on ear 50c is inserted into the correspondingly shaped aperture 66b on the coupling ear 60b on connector 40b. Similarly, each of the oppositely aligned first and second coupling ears on the connectors are correspondingly interengaged by compressing the flexible collars inwardly as necessary to provide clearance for the tabs 54 to fit within the inner surface 43 of the opposite collar and be positioned within the slots 66. The compressive force is then released to provide a spring loaded secure coupling between the two connectors 40b and 40c. Due to the unique construction of the connectors and coupling ears, each collar can be manufactured in an identical manner and used both for joining a duct to a heating apparatus or coupling two sections of duct using two such connectors. In the latter application as shown in FIG. 1, the foam polymeric material 49 on each of the flange surfaces 46b and 46c forms a relatively air-tight seal between the two ducts 30 and 70. The tabs 54 and 64 on the coupling ears 50 and 60, respectively, are spaced in relationship to the surfaces 46 of flanges 44 on the connectors 40 such that tabs 54 can be inserted into slots 66 thereby providing interlocking means for joining two connectors. In addition to being interengaging members, each of the tabs 54 and 64 on the coupling ears 50 and 60, respectively, can also serve to attach and hold a connector 40 to heating apparatus as shown in FIG. 1.

By molding the collar and flange portion of each of the connectors of a flexible polymeric material such as polyvinyl chloride, a variety of cross-sectional shapes can be obtained. For example, the collar portion of each connector may be circular and, therefore, adapted to accommodate a circular duct material while the flange is rectangular. Likewise, both the collar and the flange can be rectangular or the flange circular and the collar rectangular. In some connectors, the flange may be omitted and only a collar with coupling ears provided.

Although the preferred embodiment illustrated in the figures employs four coupling ears (two of each type), in some installations only two coupling ears (one of each type) may be required while in other installations a number greater than four may be necessary. By circumferentially spacing the coupling ears at predetermined intervals around one end of the collar, any desired number of first and second coupling ears can be provided for coupling a duct to a heating apparatus or interconnecting two sections of duct using a single connector design.

It may be desirable in some installations to provide one connector with only one type of coupling ear and a mating connector with only the other type of coupling ear. It is possible, therefore, to use any desired arrangement of coupling ears as long as mating connectors will interconnect as described herein. These and other modifications of the preferred embodiment will be apparent to those skilled in the art but will fall within the scope of the present invention as defined by the appended claims.

The embodiments of the invention in which an exclusive property or privilege is claimed are defined as follows.

1. A duct including a duct conduit having a connector at each end for coupling said duct to a duct receiving aperture in heating/cooling apparatus or to an end of a second section of duct having a similar connector, each said connector comprising:
a collar having one end receiving an end of said duct conduit; a first coupling ear on said collar at another end remote from said one end, said first coupling ear extending generally axially away from said other end; said first coupling ear including a tab portion extending therefrom and spaced from said other end of said collar; a second coupling ear on said other end of said collar, spaced from said first coupling ear, said second coupling ear extending generally axially away from said other end and including a tab portion extending therefrom and in spaced relationship to said other end of said collar, said second coupling ear further including an aperture formed in said ear adjacent said tab; said tab of said first coupling ear being shaped to fit within said aperture of said second coupling ear whereby said tabs of first and second coupling ears can be used to fit over the edge of a duct receiving aperture, sandwiching said edge between said other end of said collar and said tabs to thereby secure said connector to said duct receiving aperture, and whereby said tab of said first coupling ear of one connector can be inserted in an aperture of a second coupling ear of another of said connectors to thereby join two connectors and two duct sections together.

2. The apparatus as defined in claim 1 where there are at least two of said first coupling ears and tabs disposed generally opposite one another on each said collar and at least two of said second coupling ears disposed generally opposite one another on said collar;
said collar being sufficiently flexible to facilitate insertion of said tabs of said first coupling ears into said apertures of said second coupling ears.

3. The apparatus as defined in claim 2 wherein said other end of each said collar includes a flange portion coupled thereto and having a surface in approximate parallel relationship with said tabs of said first and second coupling ears.

4. The apparatus as defined in claim 3 wherein said coupling ears extend outwardly from an inner surface of each said collar.

5. The apparatus as defined in claim 4 and further including an additional pair of first and second coupling ears mounted to each said collar such that first and second coupling ears are alternately spaced in a predetermined relationship around the periphery of said collar.

6. The apparatus as defined in claim 5 wherein compressible sealing means is attached to said flange of each said collar at a surface in proximate relationship to said tabs.

7. The apparatus as defined in claim 6 wherein each said collar has a circular cross section.

8. A duct including a duct conduit having a universal air duct connector at each end of said conduit, each said connector comprising:
a flexible collar having one end receiving an end of said duct conduit and an outwardly extending flange coupled at the other end remote from said one end;
a first coupling ear attached to an inner surface of said collar at said other end and including a tab portion extending outwardly therefrom over said flange; and
a second coupling ear attached to said inner surface of said collar at said other end and spaced from said first coupling ear a predetermined distance, said second ear including a tab portion extending outwardly therefrom over said flange, said second ear further including a tab receiving aperture formed therein adjacent said tab, said tab of said first coupling ear being shaped to fit within said aperture of said second coupling ear whereby said tabs of said first and second coupling ears can be used to fit over the edge of a duct receiving aperture, sandwiching said edge between said other end of said collar and said tab portions to thereby secure said connector to said duct receiving aperture, and whereby said tab of said first coupling ear of one connector can be inserted in said aperture of said second coupling ear of another connector to thereby join two connectors and two duct sections together.

9. The apparatus as defined in claim 8 and further including an additional pair of first and second coupling ears mounted to each said collar such that first and second coupling ears are alternately spaced in a predetermined relationship around the periphery of said collar.

10. The apparatus as defined in claim 8 wherein on each said collar said tab on said first ear is narrower than said tab on said second ear, and said tab receiving aperture formed in said second ear comprises a slot for receiving a tab shaped in conformity with said narrower tab.

11. The apparatus as defined in claim 10 wherein each said collar is cylindrical.

12. The apparatus as defined in claim 11 and further including compressible sealing means coupled to said flange of each said collar between said flange and said tabs.

* * * * *